(12) United States Patent
Borja

(10) Patent No.: US 10,527,069 B1
(45) Date of Patent: Jan. 7, 2020

(54) PROPORTIONAL VALVE WITH AN UNSEATER SPRING

(71) Applicant: Sun Hydraulics, LLC, Sarasota, FL (US)

(72) Inventor: Andy Borja, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 7 days.

(21) Appl. No.: 16/037,518

(22) Filed: Jul. 17, 2018

(51) Int. Cl.
*F15B 13/043* (2006.01)
*F15B 13/04* (2006.01)
*F15B 13/044* (2006.01)

(52) U.S. Cl.
CPC ........ *F15B 13/0405* (2013.01); *F15B 13/044* (2013.01); *F15B 2211/3056* (2013.01); *F15B 2211/30525* (2013.01)

(58) Field of Classification Search
CPC ............... F15B 13/0405; F15B 13/044; F15B 2211/30525; F15B 2211/3056
USPC ..... 137/596.14, 493.1, 493.2, 493.3, 614.16, 137/614.17, 614.18, 630; 251/129.15, 38, 251/51, 77
See application file for complete search history.

(56) References Cited

U.S. PATENT DOCUMENTS

| | | | | |
|---|---|---|---|---|
| 2,969,088 A * | 1/1961 | Kramer | ................. | F16K 31/408 137/614.2 |
| 3,100,103 A * | 8/1963 | Bullard | ................. | F16K 31/408 251/30.03 |
| 4,526,340 A * | 7/1985 | Kolchinsky | ............... | H01F 7/16 251/38 |
| 4,540,154 A * | 9/1985 | Kolchinsky | ........... | F16K 31/408 137/315.03 |
| 4,592,533 A * | 6/1986 | Guglielmi | ............. | F16K 31/408 251/129.15 |
| 5,205,531 A * | 4/1993 | Kolchinsky | ........... | F16K 31/408 251/129.15 |
| 5,271,599 A * | 12/1993 | Kolchinsky | ........... | F16K 31/408 251/30.01 |
| 5,842,679 A * | 12/1998 | Kolchinsky | ........... | F16K 31/408 251/30.04 |
| 6,149,124 A * | 11/2000 | Yang | ..................... | F16K 31/408 251/30.03 |
| 6,328,275 B1 * | 12/2001 | Yang | ..................... | F16K 31/406 137/487.5 |
| 6,330,798 B1 * | 12/2001 | Stephenson | ........... | F15B 11/006 60/424 |

(Continued)

*Primary Examiner* — Minh Q Le
(74) *Attorney, Agent, or Firm* — McDonnell Boehnen Hulbert & Berghoff LLP

(57) ABSTRACT

An example valve includes: a sleeve; a first poppet configured to be seated on a first seat defined on an interior surface of the sleeve when the valve is in a closed state, and where the first poppet is configured to move axially within the sleeve; a second poppet disposed, at least partially, in the first poppet, where the second poppet is configured to be seated on a second seat defined on an interior surface of the first poppet, and where the second poppet is configured to move axially within the first poppet; a first spring that interfaces with the second poppet and applies a first force on the second poppet in a distal direction toward the second seat; and a second spring that interfaces with the second poppet and applies a second force on the second poppet in a proximal direction opposite the distal direction.

18 Claims, 7 Drawing Sheets

(56) References Cited

U.S. PATENT DOCUMENTS

| | | | | |
|---|---|---|---|---|
| 6,467,264 | B1* | 10/2002 | Stephenson | F15B 11/006 60/368 |
| 6,971,232 | B2* | 12/2005 | Singh | B60K 6/12 251/30.02 |
| 10,119,627 | B2* | 11/2018 | Des Garennes | F16K 31/408 |
| 2019/0309772 | A1* | 10/2019 | Faivre | F15B 13/0807 |

* cited by examiner

PROPORTIONAL VALVE WITH AN UNSEATER SPRING

BACKGROUND

A hydraulic valve directs the flow of a liquid medium, usually oil, through a hydraulic system. The direction of the oil flow is determined by the position of a movable element such as a spool or a poppet. An example valve may have the movable element inside a housing or sleeve. For instance, the valve may include a poppet that is movable by an actuation mechanism (e.g., electric, hydraulic, pneumatic, or manual). The poppet may be seated on a valve seat formed inside the housing. Once the valve is actuated, the poppet moves off the seat to allow flow around the poppet from an inlet port to an outlet port.

SUMMARY

The present disclosure describes implementations that relate to a proportional valve with an unseater spring. In a first example implementation, the present disclosure describes a valve. The valve includes: (i) a sleeve; (ii) a first poppet disposed in the sleeve, where the first poppet is configured to be seated on a first seat defined on an interior surface of the sleeve when the valve is in a closed state, and where the first poppet is configured to move axially within the sleeve; (iii) a second poppet disposed, at least partially, in the first poppet, where the second poppet is configured to be seated on a second seat defined on an interior surface of the first poppet, and where the second poppet is configured to move axially within the first poppet; (iv) a first spring that interfaces with the second poppet and applies a first force on the second poppet in a distal direction toward the second seat; and (v) a second spring that interfaces with the second poppet and applies a second force on the second poppet in a proximal direction opposite the distal direction.

In a second example implementation, the present disclosure describes another valve. The valve includes: (i) a sleeve defining a first longitudinal cylindrical cavity therein; (ii) a first movable element disposed in the first longitudinal cylindrical cavity of the sleeve, where the first movable element is configured to be seated on a first seat defined on an interior surface of the sleeve when the valve is in a closed state, where the first movable element is configured to move axially within the sleeve, and where the first movable element defines a second longitudinal cylindrical cavity therein; (iii) a second movable element disposed, at least partially, in the second longitudinal cylindrical cavity of the first movable element, where the second movable element is configured to be seated on a second seat defined on an interior surface of the first movable element, and where the second movable element is configured to move axially within the first movable element; (iv) a first spring that interfaces with the second movable element and applies a first force on the second movable element in a distal direction toward the second seat; (v) a second spring that interfaces with the second movable element and applies a second force on the second movable element in a proximal direction opposite the distal direction; and (vi) an actuator comprising a plunger coupled to the second movable element, such that the plunger is configured to apply a third force on the second movable element in the proximal direction.

In a third example implementation, the present disclosure describes a hydraulic system. The hydraulic system includes: a source of pressurized fluid; a reservoir; and a valve. The valve includes: (i) a sleeve defining a first port fluidly coupled to the reservoir and a second port coupled to the source of pressurized fluid; (ii) a first poppet disposed in the sleeve, where the first poppet is configured to be seated on a first seat defined on an interior surface of the sleeve when the valve is in a closed state to block flow from the second port to the first port, and where the first poppet is configured to move axially within the sleeve; (iii) a second poppet disposed, at least partially, within the first poppet, where the second poppet is configured to be seated on a second seat defined on an interior surface of the first poppet, and where the second poppet is configured to move axially within the first poppet; (iv) a first spring that interfaces with the second poppet and applies a first force on the second poppet in a distal direction toward the second seat; and (v) a second spring that interfaces with the second poppet and applies a second force on the second poppet in a proximal direction opposite the distal direction.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

In examples, a normally-closed valve may have a poppet that is seated on a seat formed as a protrusion from an interior surface of a cage, sleeve, valve body, or housing. When the valve is actuated, the poppet is unseated and moves within the valve body to form a gap between an exterior surface of the poppet and the seat, thereby allowing fluid to flow from an inlet port through the gap to an outlet port. The valve may be a proportional valve where an axial position of the poppet affects the flow rate across the valve for a given pressure drop between the inlet port and the outlet port.

In examples, the poppet may be unseated by an actuation force using an electric force applied by a solenoid, using hydraulic or pneumatic force, or by direct manual actuation. In examples, when the valve is in a closed state and the poppet is seated, an initial large pressure at the inlet port may be acting on the poppet to apply a force thereto and keep the poppet seated. When the actuation force is applied to the poppet to move it off the seat, the actuation force rises until it overcomes at least the force applied to the poppet by the pressure at the inlet port. As the poppet is unseated, pressure at the inlet port collapses as fluid flows from the inlet port to the outlet port. Thus, the actuation force that has been applied to overcome the initial large inlet pressure may cause the poppet to be lunged or thrusted open, and thus move a large axial distance, thus allowing an abrupt large increase in flow rate across the valve. Such abrupt increase in flow rate may cause an actuator (e.g., a cylinder or motor) controlled by the valve to move faster than expected, which may be undesirable.

Thus, it may be desirable to configure the valve such that the poppet moves more predictably and proportionally to the actuation force, rather than lunging open once the poppet moves off its seat.

Figure 1:
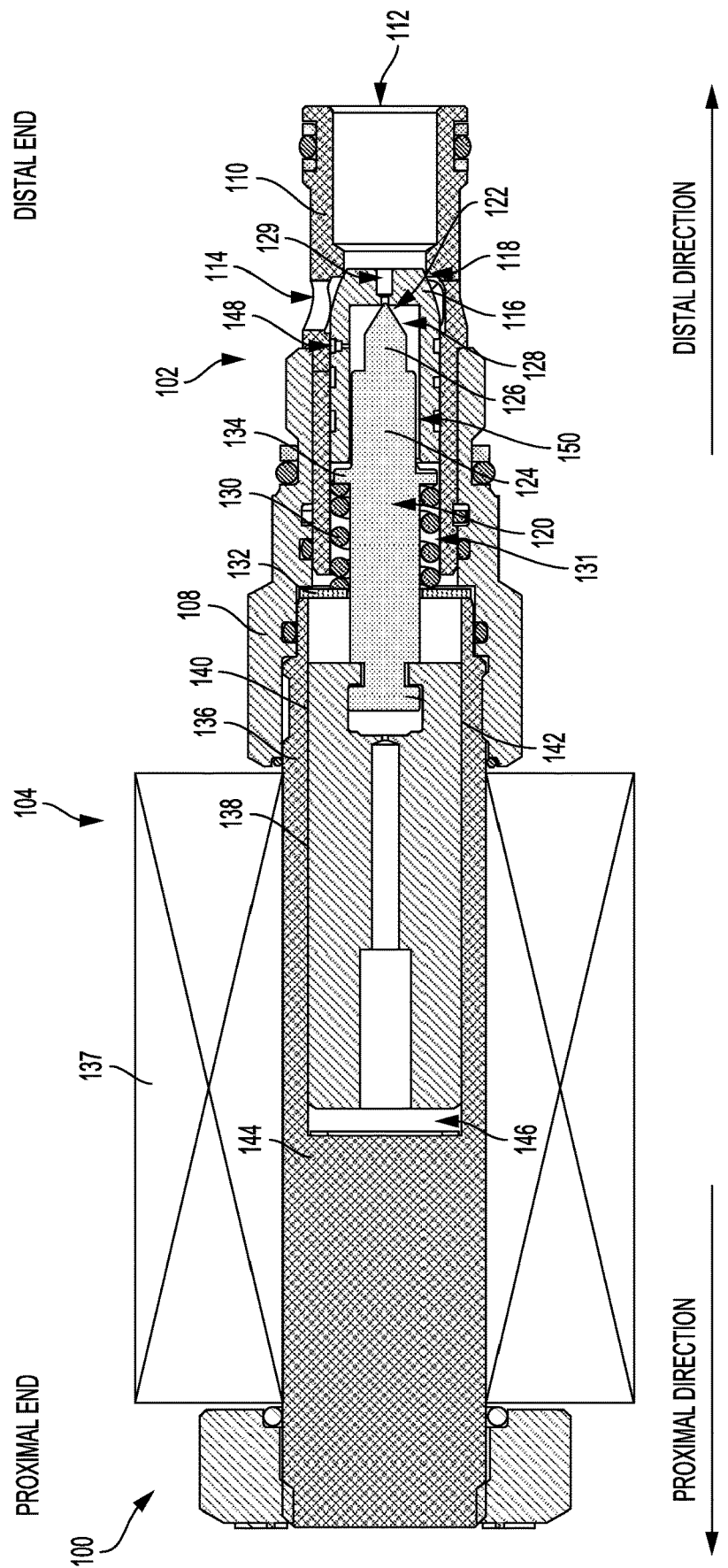
FIG. 1 illustrates a cross-sectional view of a valve in a closed state, in accordance with an example implementation.

FIG. 1 illustrates a cross-sectional view of a valve 100 in a closed state, in accordance with an example implementation. The valve 100 includes a main valve section 102 and a solenoid actuator 104.

The main valve section 102 includes a housing 108 that defines a longitudinal cylindrical cavity therein. The longitudinal cylindrical cavity of the housing 108 is configured to receive at a first or distal end thereof a sleeve 110 coaxial with the housing 108. The sleeve 110 defines a first port 112 and a second port 114. The first port 112 is defined at a nose of the sleeve 110, whereas the second port 114 can comprise holes disposed in a radial array about an exterior surface of the sleeve 110. The valve 100 is configured to control flow of fluid between the second port 114 and the first port 112.

The sleeve 110 defines a respective longitudinal cylindrical cavity therein. A first poppet 116 is disposed in the longitudinal cylindrical cavity defined within the sleeve 110, where the first poppet 116 is coaxial with the housing 108 and the sleeve 110. The first poppet 116 could also be referred to as a main or primary poppet.

In the closed state shown in FIG. 1, the first poppet 116 is seated on a first seat 118 defined by an interior surface of the sleeve 110. The first poppet 116 has a respective tapered circumferential surface that contacts the first seat 118 when the first poppet 116 is seated (e.g., when the valve 100 is in the closed state).

The first poppet 116 defines a respective longitudinal cylindrical cavity therein. A second poppet 120 is disposed, at least partially, in the longitudinal cylindrical cavity defined within the first poppet 116. The second poppet 120 is coaxial with the housing 108, the sleeve 110, and the first poppet 116. The second poppet 120 may also be referred to as a dart or secondary poppet.

In the closed state shown in FIG. 1, the second poppet 120 is seated on a second seat 122 defined by an interior surface of the first poppet 116. The second poppet 120 has a respective tapered circumferential surface that contacts the second seat 122 when the second poppet 120 is seated thereon.

Further, the second poppet 120 includes a first cylindrical portion 124 and a second cylindrical portion 126. The first cylindrical portion 124 has a larger diameter than a respective diameter of the second cylindrical portion 126. A chamber 128 is defined within the first poppet 116 between an exterior surface of the second poppet 120 (e.g., an exterior surface of the second cylindrical portion 126) and the interior surface of the first poppet 116. The chamber 128 is configured to be fluidly coupled to the first port 112, when the second poppet 120 is unseated, via a longitudinal channel 129 formed in a distal end portion (or nose end portion) of the first poppet 116. The chamber 128 is also configured to be fluidly coupled to the second port 114 via a pilot feed orifice 148.

The valve 100 further includes a spring 130 disposed in a chamber 131 defined within the sleeve 110 and the housing 108. The spring 130 is disposed around an exterior surface of the second poppet 120. For example, the spring 130 may be disposed around a portion of the exterior surface of the second poppet 120 having the same diameter of the first cylindrical portion.

The spring 130 is disposed or constrained between a spring support member 132 fixedly disposed in the longitudinal cylindrical cavity of the housing 108 and a flanged portion 134 projecting from the exterior surface of the second poppet 120. The spring 130 applies a force on the flanged portion 134, and thus on the second poppet 120, in a closing or distal direction (e.g., to the right in FIG. 1). As a result of the force applied by the spring 130 on the second poppet 120, the second poppet 120 remains seated at the second seat 122. The second poppet 120 in turn applies a force on the first poppet 116 in the distal direction to maintain the first poppet 116 seated at the first seat 118 when the valve 100 is in the closed state.

The second poppet 120 is configured to move axially in the longitudinal cylindrical cavity defined within the first poppet 116 when the valve 100 is actuated by any type of actuation mechanisms. As depicted in FIG. 1, the valve 100 includes the solenoid actuator 104 configured to move the second poppet 120. However, other actuation mechanisms (e.g., manual, hydraulic, pneumatic, etc.) could be used.

The solenoid actuator 104 includes a solenoid tube 136 disposed within and received at a second or proximal end of the housing 108, such that the solenoid tube 136 is coaxial with the housing 108. A solenoid coil 137 is disposed about an exterior surface of the solenoid tube 136.

The solenoid tube 136 is configured to house a plunger or armature 138. The armature 138 defines therein an internal annular groove 140 on an interior surface of the armature 138. The internal annular groove 140 is formed as a recessed portion on the interior surface of the armature 138 and is configured to receive an enlarged proximal end 142 of the second poppet 120. With this configuration, the second poppet 120 is coupled to the armature 138, such that axial motion of the armature 138 causes the second poppet 120 to move axially as well.

Further, the solenoid tube 136 includes a pole piece 144 formed at a proximal end of the solenoid tube 136. The pole piece 144 is separated from the armature 138 by an airgap 146. The pole piece 144 is composed of material of high magnetic permeability.

In operation, the first port 112 may be fluidly coupled to a low pressure reservoir or tank, whereas the second port 114 may be fluidly coupled to a source of pressurized fluid (e.g., a pump or accumulator). The pressurized fluid received at the second port 114 is communicated through unsealed spaces between an interior surface of the sleeve 110 and the exterior surface of the first poppet 116, and through the pilot feed orifice 148 disposed in the first poppet 116, to the chamber 128.

Pressurized fluid in the chamber 128 may then be communicated through a longitudinal slot 150 formed (e.g., milled) in the exterior surface of the second cylindrical portion 126 of the second poppet 120, around the flanged portion 134 to the chamber 131 that houses the spring 130. Also, the pressurized fluid received at the second port 114 is communicated through the unsealed space between the interior surface of the sleeve 110 and the exterior surface of the first poppet 116, around the flanged portion 134 to the chamber 131.

As such, the pressurized fluid received at the second port 114 is communicated to the chamber 131, and the pressurized fluid in the chamber 131 applies a force on the flanged portion 134 of the second poppet 120 in the distal direction to maintain the second poppet 120 seated at the second seat 122. The force is then transferred to the first poppet 116 and pushes the first poppet 116 in the distal direction against the first seat 118. The force can be determined by multiplying a pressure level of the pressurized fluid received at the second port 114 by an effective area of the second seat 122. The effective area of the second seat 122 can be estimated as a circular area having a diameter of the second seat 122. As an example for illustration, the pressure level of the pressurized fluid received at the second port 114 may be about 5000 pounds per square inch (psi). The diameter of the second seat 122, as an example for illustration, may range from 0.022 inch to 0.024. Assuming a diameter of about 0.022 inch, the effective area can be determined as 0.00038 and the force that the pressurized fluid applies can be determined as about 1.9 pound-force (lbf).

Additionally, the spring 130 also applies a force on the flanged portion 134 and the second poppet 120 in the distal direction. Thus, the force applied by the pressurized fluid in the chamber 131 and the force of the spring 130 maintain the second poppet 120 and the first poppet 116 seated and the valve 100 in a closed state when the valve 100 is unactuated.

When an electric current or voltage is provided to the solenoid coil 137, the solenoid coil 137 is energized and a magnetic field is generated therefrom. The pole piece 144 directs the magnetic field through the airgap 146 toward the armature 138, which is movable and is attracted toward the pole piece 144. In other words, when an electric current is provided to the solenoid coil 137, the generated magnetic field forms a north and south pole in the pole piece 144 and the armature 138, and therefore the pole piece 144 and the armature 138 are attracted to each other. Because the pole piece 144 is fixed as part of the solenoid tube 136 and the armature 138 is movable, the armature 138 is attracted and is movable across the airgap 146 toward the pole piece 144. Thus, when the electric current or voltage is provided to the solenoid coil 137, a solenoid force is generated and is applied to the armature 138, thereby attracting the armature 138 toward the pole piece 144.

As described above, the armature 138 is coupled to the second poppet 120 due to the interaction between the enlarged proximal end 142 of the second poppet 120 and the internal annular groove 140 of the armature 138. Thus, the armature 138 and the second poppet 120 move in the proximal direction with each other. For the armature 138 and the second poppet 120 to move in the proximal direction, the solenoid force applied to the armature 138 overcomes the force of the spring 130 and the force that the pressurized fluid in the chamber 131 applies to the second poppet 120 in the distal direction.

As such, the electric current or voltage provided to the solenoid coil 137 may be increased to increase a magnitude of the solenoid force until the solenoid force overcomes the force of the spring 130 and the force of the pressurized fluid in the chamber 131 on the second poppet 120. Once, the solenoid force reaches a magnitude that overcomes the combined forces of the spring 130 and the pressurized fluid in the chamber 131, the armature 138 moves in the proximal direction. As the armature 138 moves toward the pole piece 144, the second poppet 120 moves therewith, and is thus unseated off the second seat 122.

As a result, fluid in the chamber 128 is allowed to flow around a distal tip of the second poppet 120 through the longitudinal channel 129 to the first port 112. The first port 112 may be fluidly coupled to a low pressure reservoir or tank as mentioned above. Thus, the pressure level in the chamber 128 is reduced as the fluid therein is vented from the chamber 128 through the first port 112 to the reservoir.

The pressurized fluid received at the second port 114 applies a force in a proximal direction (e.g., to the left in FIG. 1) on a tapered exterior surface of a nose or distal end of the first poppet 116. Because of the difference in pressure level between the fluid received at the second port 114 and the reduced pressure level of the fluid in the chamber 128, the first poppet 116 is moved axially in the proximal direction (e.g., to the left in FIG. 1) and is unseated off the first seat 118 to follow the second poppet 120 in the proximal direction. As the first poppet 116 moves off the first seat 118, a gap or flow area is formed between the exterior surface of the first poppet 116 and the interior surface of the sleeve 110, thus allowing fluid to flow from the second port 114 around the first poppet 116 through the flow area to the first port 112.

As fluid is allowed to flow from the second port 114 to the first port 112, the pressure level at the second port 114, and thus the pressure level at the chamber 131, may collapse (e.g., may be reduced at a high rate of pressure reduction). Such collapse or reduction in pressure in the chamber 131 causes the force that the pressurized fluid in the chamber 131 applies on the second poppet 120 in the distal direction to be reduced abruptly. On the other hand, the solenoid force, which is based on the electric current or voltage provided to the solenoid coil 137, has not changed. As a result, the second poppet 120 is lunged or thrusted abruptly in the proximal direction. The first poppet 116 follows the second poppet 120, and is thus also lunged or thrusted in the proximal direction, causing the flow area between the first poppet 116 and the sleeve 110 to increase and for the flow rate across the valve 100 to increase abruptly.

Figure 2:
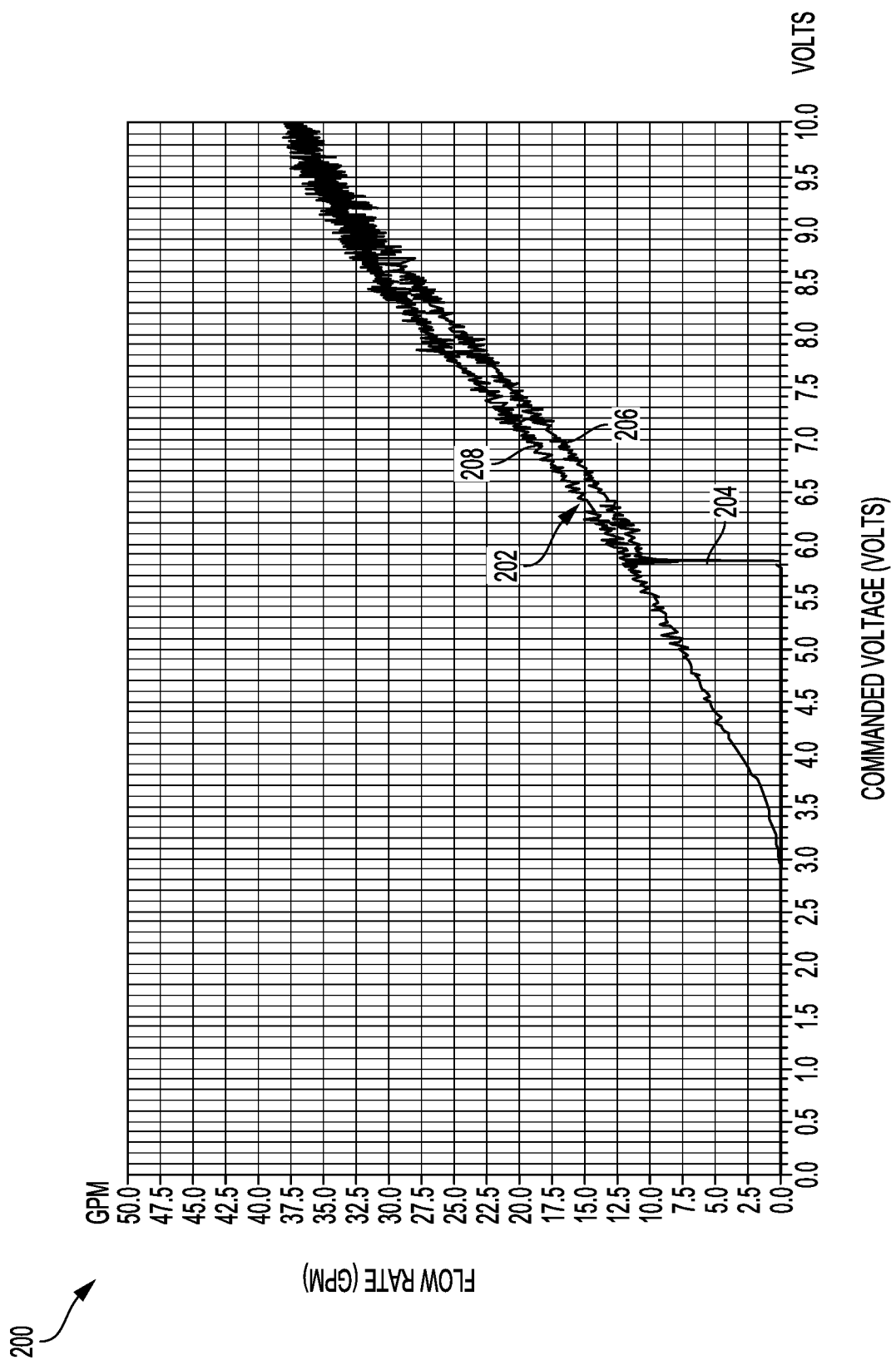
FIG. 2 illustrates a graph having a plot of variation of flow rate across the valve in FIG. 1 based on variation in commanded voltage to a solenoid coil, in accordance with an example implementation.

FIG. 2 illustrates a graph 200 having a plot 202 of variation of flow rate across the valve 100 based on variation in commanded voltage to the solenoid coil 137, in accordance with an example implementation. Commanded voltage is shown in Volts on the x-axis of the graph 200, and flow rate of fluid flow across the valve 100 is shown on the y-axis of the graph 200 in gallons per minute (GPM).

As depicted in FIG. 2, commanded voltage is increased gradually, and the valve 100 does not open until the commanded voltage reaches about 5.7 volts. At that voltage, the solenoid force overcomes the combined forces of the spring 130 and the pressurized fluid in the chamber 131 acting on the second poppet 120, and the second poppet 120 is thus unseated. As mentioned above, fluid is then allowed to flow from the chamber 128 to the first port 112, thereby causing a pressure level reduction in the chamber 128, and the first poppet 116 moves off the first seat 118 in the proximal direction following the second poppet 120. Fluid at the second port 114 is thus allowed to flow directly from the second port 114 to the first port 112, and the pressure level at the second port 114 collapses. The pressure level in the chamber 131, the chamber 128, and the airgap 146 also collapses. Such collapse in pressure causes both the second poppet 120 and the first poppet 116 to be lunged or thrusted in the proximal direction, thereby allowing the flow rate across the valve 100 to increase abruptly. Such abrupt increase in the flow rate is shown by a portion 204 of the plot 202 indicating a step increase in the flow rate from a value close to zero to about 10 GPM.

Thereafter, a portion 206 of the plot 202 indicates proportional increase in the flow rate as the commanded voltage is increased until a value of about 10 volts. The commanded voltage is then reduced gradually from the value of about 10 volts to zero volts, and the corresponding variation in flow rate is depicted by portion 208 of the plot 202.

The abrupt increase in flow rate as depicted by the portion 204 of the plot 202 may be undesirable. For example, a speed of an actuator controlled by the valve 100 may increase suddenly, which may be undesirable. To alleviate such abrupt increase in the flow rate, an unseater spring may be added to the valve 100 to oppose or balance the force applied by the pressurized fluid in the chamber 131 on the second poppet 120.

Figure 3:
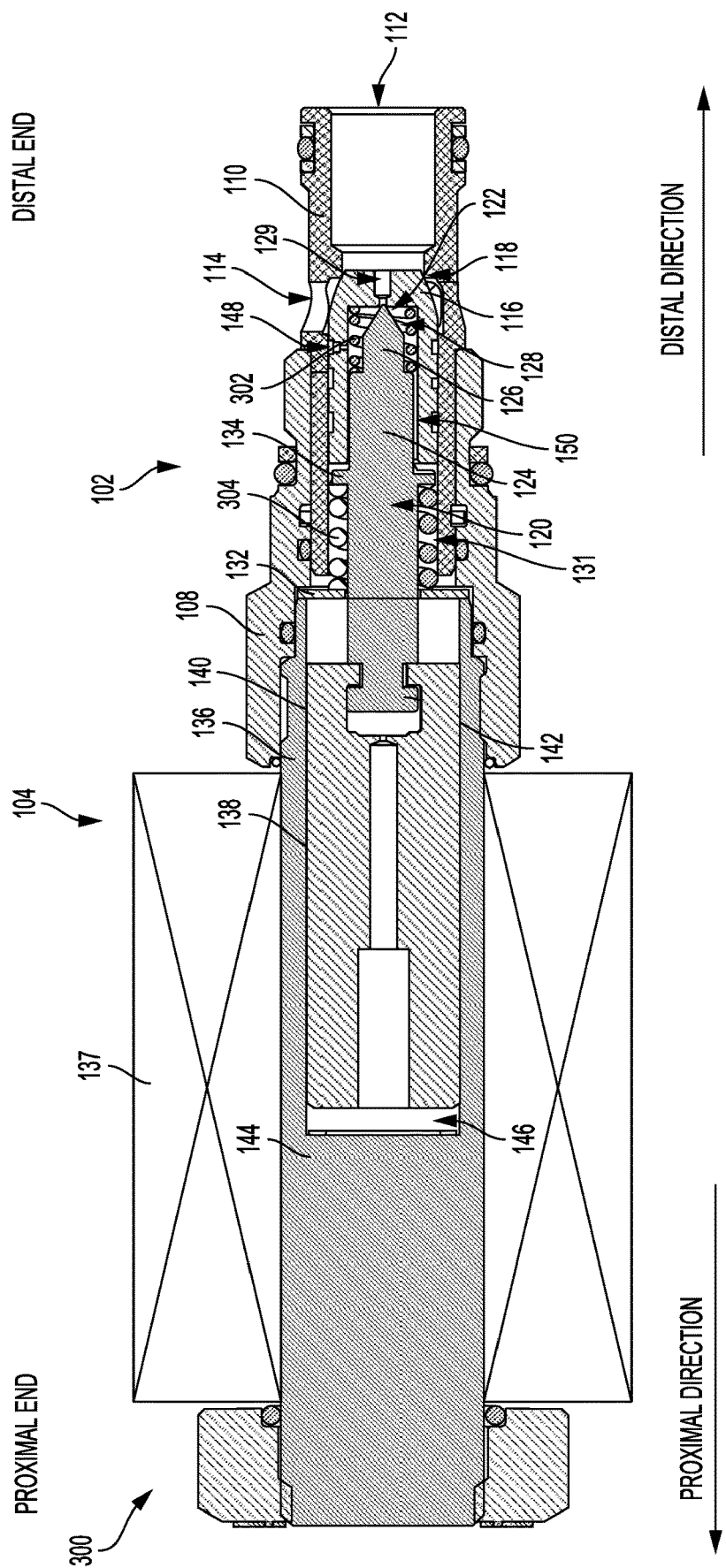
FIG. 3 illustrates cross-sectional view of a valve having an unseater spring, in accordance with an example implementation.

FIG. 3 illustrates a cross-sectional view of a valve 300 having an unseater spring 302, in accordance with an example implementation. Similar components between the valve 100 and the valve 300 are designated with the same reference numbers. The spring 130 is replaced by a spring 304, which may be configured similar to the spring 130 but may have a larger spring rate and cause a larger force on the second poppet 120 in the distal direction.

The unseater spring 302 is disposed about the exterior surface of the second poppet 120, and particularly about the exterior surface of the second cylindrical portion 126 having the smaller diameter compared to the first cylindrical portion 124 of the second poppet 120.

The unseater spring 302 is disposed or constrained between an interior distal surface of the first poppet 116 and a shoulder 306 formed of a stepped surface on the exterior surface the second poppet 120. The shoulder 306 is formed at a transition from a first diameter of the second poppet 120 at the first cylindrical portion 124 to a second diameter of the second poppet 120 at the second cylindrical portion 126.

With this configuration, the unseater spring 302 applies a force on the second poppet 120 in the proximal direction that opposes and balances the force that the pressurized fluid in the chamber 131 applies on the second poppet 120 in the distal direction. Thus, the force applied by the unseater spring 302 assists the solenoid force that is generated when an electric current or voltage is provided to the solenoid coil 137, and helps lift the second poppet 120 off the second seat 122.

In the example illustration mentioned above with the pressurized fluid causing a force of about 1.9 lbf in the distal direction, the unseater spring 302 may be configured to apply a force of about 1.5 lbf in the proximal direction to balance most of the 1.9 lbf force of the pressurized fluid. This way, the pressurized fluid may still apply a seating force on the second poppet 120 in the distal direction, but the net force applied on the second poppet 120 is now reduced from 1.9 lbf to about 0.4 lbf. In other words, to unseat the second poppet 120, the solenoid force overcomes the spring force of the spring 304 and a portion, as opposed to all, of the force applied by the pressurized fluid in the chamber 131, the chamber 128, and the airgap 146.

In an example, the spring 304 may have a larger spring rate and may be configured to apply a larger force on the second poppet 120 in the distal direction compared to the spring 130 of the valve 100, which is configured without the unseater spring 302. As an example for illustration, the spring 130 may be configured to apply a force of about 2 lbf on the second poppet 120 in the distal direction, whereas the spring 304 may be configured to apply a force of about 3.5 lbf on the second poppet 120 in the distal direction.

The unseater spring 302 has a smaller spring rate compared to the spring 304. For example, the unseater spring 302 may have a spring rate of about half, third, or quarter of the spring rate of the spring 304. As an example for illustration, the spring 304 may have a spring rate of about 190 lbf/inch, whereas the unseater spring 302 may have a spring rate between 60 and 100 lbf/inch. These values are examples for illustration only, and other examples are possible.

Despite the increased force of the spring 304 compared to the spring 130, with the presence of the unseater spring 302, the solenoid force overcomes a more predictable force, and the second poppet 120 may thus be lifted smoothly off the second seat 122 without lunging. Particularly, the solenoid force opposes the spring force of the spring 304 (e.g., 3.5 lbf) and a portion (e.g., 0.4 lbf) of the force applied by the pressurized fluid in the chamber 131. Thus, when the second poppet 120 is lifted off the second seat 122 and the first poppet 116 follows the second poppet 120 causing pressure in the chamber 131 to collapse, the change in the force that the solenoid force opposes does not change significantly. For example, if the pressure drops from the initial pressure level of 5000 psi to 4000 psi, the force that is applied by the pressurized fluid in the distal direction is reduced from 1.9 lbf to about 1.5 lbf. If the unseater spring 302 applies a force of about 1.5 lbf on the second poppet 120 in the proximal direction, then the unseater spring 302 balances and substantially cancels the force of the pressurized fluid in the distal direction. Further, when the pressure level is reduced from 5000 psi to 4000 psi, the total force of the spring 304 and the pressurized fluid that the solenoid force opposes is changed by about 0.4 lbf. Such a small change in force that the solenoid force opposes, and balancing the force of the pressurized fluid by the unseater spring 302 precludes the second poppet 120 and the first poppet 116 from lunging or thrusting in the proximal direction when the pressure in the chamber 131 collapses. In other words, the solenoid force overcomes a more predictable force level despite the change in pressure level in the chamber 131. As such, the presence of the unseater spring 302 stabilizes the second poppet 120 as it moves off the second seat 122 and precludes it from lunging in the proximal direction.

Thus, as commanded voltage level is provided to the solenoid coil 137, the armature 138 applies a force on the second poppet 120 in the proximal direction, and aided with the force of the unseater spring 302, the second poppet 120 moves axially in the proximal direction. As the second poppet 120 moves off the second seat 122, a flow area is formed between a tip of the second poppet 120 and the second seat 122. The flow area operates as a restriction or an orifice.

Figure 4:
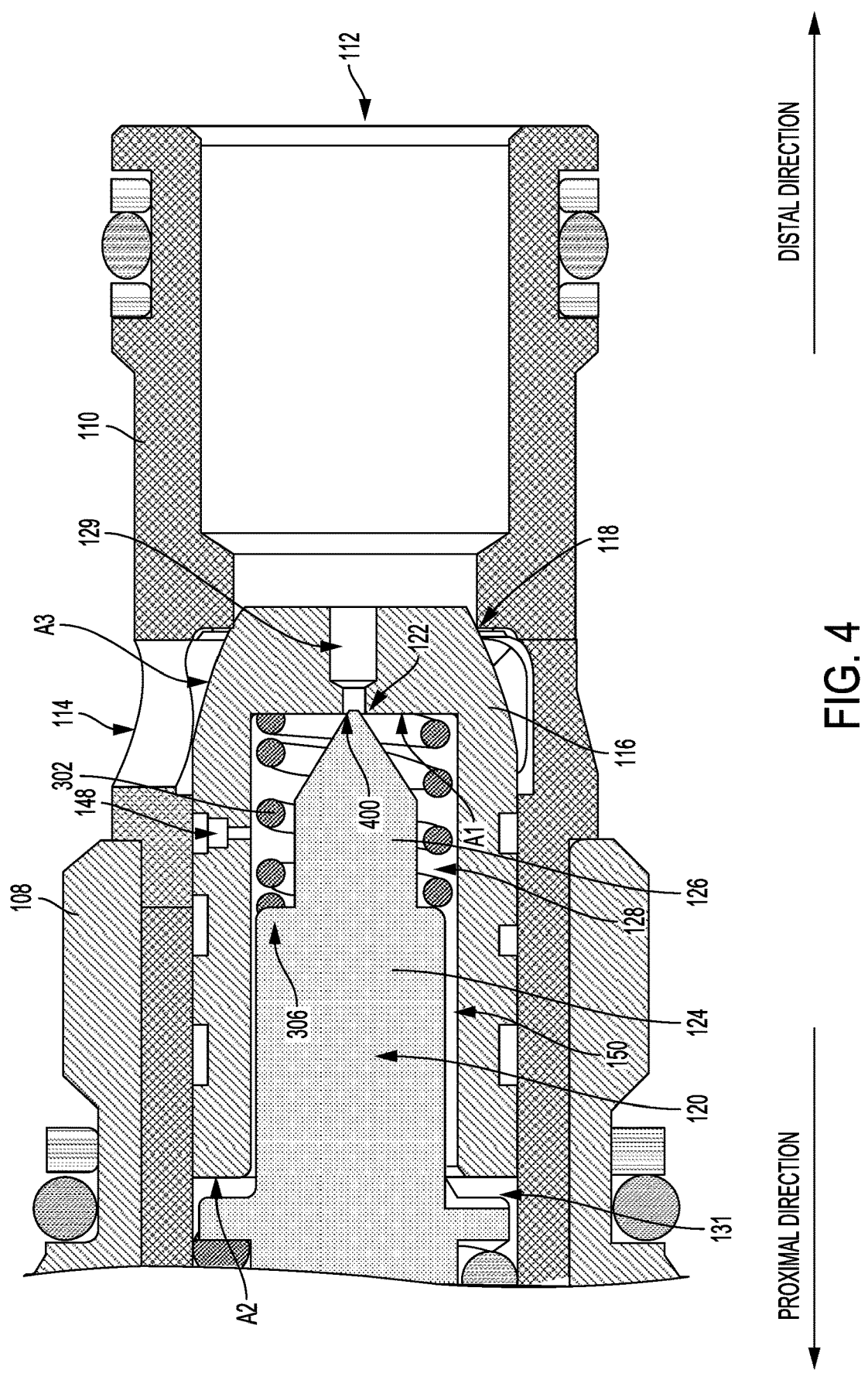
FIG. 4 illustrates a poppet of the valve in FIG. 3 lifted off a seat, in accordance with another example implementation.

FIG. 4 illustrates the second poppet 120 lifted off the second seat 122, in accordance with an example implementation. As depicted in FIG. 4, the second poppet 120 is displaced axially in the proximal direction such that a flow area 400 is formed and fluid is allowed to flow from the chamber 128 through the longitudinal channel 129 to the first port 112. Fluid flow from the chamber 128 to the first port 112 causes a pressure drop in the chamber 128 such that the pressure level in the chamber 128 is less than the pressure level of the fluid received at the second port 114.

Referring to FIG. 4, the forces that act on the first poppet 116 are (i) a first force that fluid in the chamber 128 applies in the distal direction on surface area "$A_1$" of the interior distal surface of the first poppet 116, (ii) a second force that fluid in the chamber 131 applies in the distal direction on an annular surface area "$A_2$" of a proximal end of the first poppet 116, and (iii) a third force that fluid at the second port 114 applies in the proximal direction on an annular surface area "$A_3$" that is exposed to the fluid at the second port 114. The fluid in the chamber 131 may have a pressure level that is substantially equal to the pressure level in the chamber 128 due to the fluid communication therebetween through the longitudinal slot 150. As such, assuming that pressure level in the chambers 131 and 128 is "$P_1$," and pressure level at the second port 114 is "$P_2$," then the net force "F" acting on the first poppet 116 in the proximal direction can be estimated by the following equation:

$$F = P_2 A_3 - P_1 (A_1 + A_2) \tag{1}$$

Before the second poppet 120 moves off the second seat 122 and the flow area 400 is formed, $P_1$ is substantially equal to $P_2$. Because $(A_1+A_2)$ is greater than $A_3$, the net force F is negative, indicating that the net force is acting in the distal direction to keep the first poppet 116 seated at the first seat 118. As the second poppet 120 moves off the seat and the flow area 400 is formed, the pressure level $P_1$ is reduced relative to the pressure level $P_2$ as fluid is vented from the chamber 128 to the first port 112. Initially (e.g., at low commanded voltage to the solenoid coil 137), the flow area 400 is small and the reduction in the pressure level $P_1$ is not sufficient to cause the net force F to turn positive. Particularly, referring to equation 1, a value of $P_1$ that is less than $$\frac{P_2 A_3}{(A_1 + A_2)}$$

can cause the net force F to turn positive, but as long as the pressure level $P_1$ is greater than or equal to $$\frac{P_2 A_3}{(A_1 + A_2)},$$

the pressure level $P_1$ is not reduced sufficiently to turn the net force F positive and cause the first poppet 116 to be lifted off the first seat 118. As a result, and as depicted in FIG. 4, despite the second poppet 120 being lifted off the second seat 122 to form the flow area 400, the first poppet 116 remains seated at the first seat 118, and no direct or main flow occurs from the second port 114 to the first port 112. A pilot flow occurs, however, from the second port 114 through the chamber 128 to the first port 112.

As the second poppet 120 continues to move or be displaced axially in the proximal direction, the flow area 400 increases and the pressure level $P_1$ is further reduced until it becomes less than $$\frac{P_2 A_3}{(A_1 + A_2)},$$

at which pressure level the net force F turns positive and acts on the first poppet 116 in the proximal direction causes the first poppet 116 to move or be displaced axially in the proximal direction following the second poppet 120.

Figure 5:
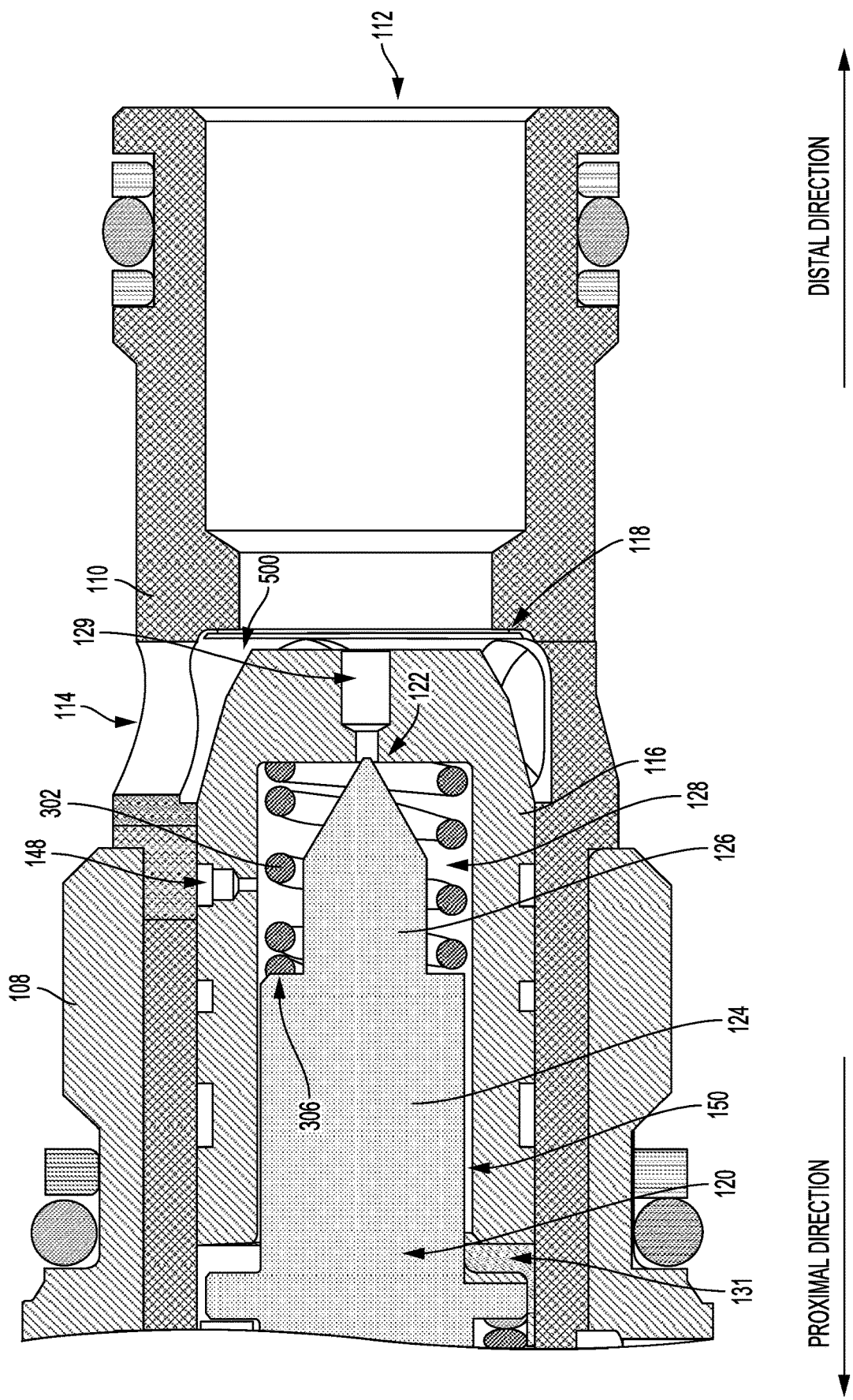
FIG. 5 illustrates another poppet of the valve in FIG. 3 lifted off another seat, in accordance with an example implementation.

FIG. 5 illustrates the first poppet 116 lifted off the first seat 118, in accordance with an example implementation. As depicted in FIG. 5, the first poppet 116 is displaced axially and lifts off the first seat 118. As a result, a flow area 500 is formed between a distal end of the first poppet 116 and the sleeve 110, and main flow occurs from the second port 114 to the first port 112.

As mentioned above, the presence of the unseater spring 302 configured to balance the force of the pressurized fluid in the chamber 131 stabilizes the second poppet 120 as it moves off the second seat 122. As a result, the abrupt increase in flow rate depicted by the portion 204 of the plot 202 shown in FIG. 2 can be avoided.

Figure 6:
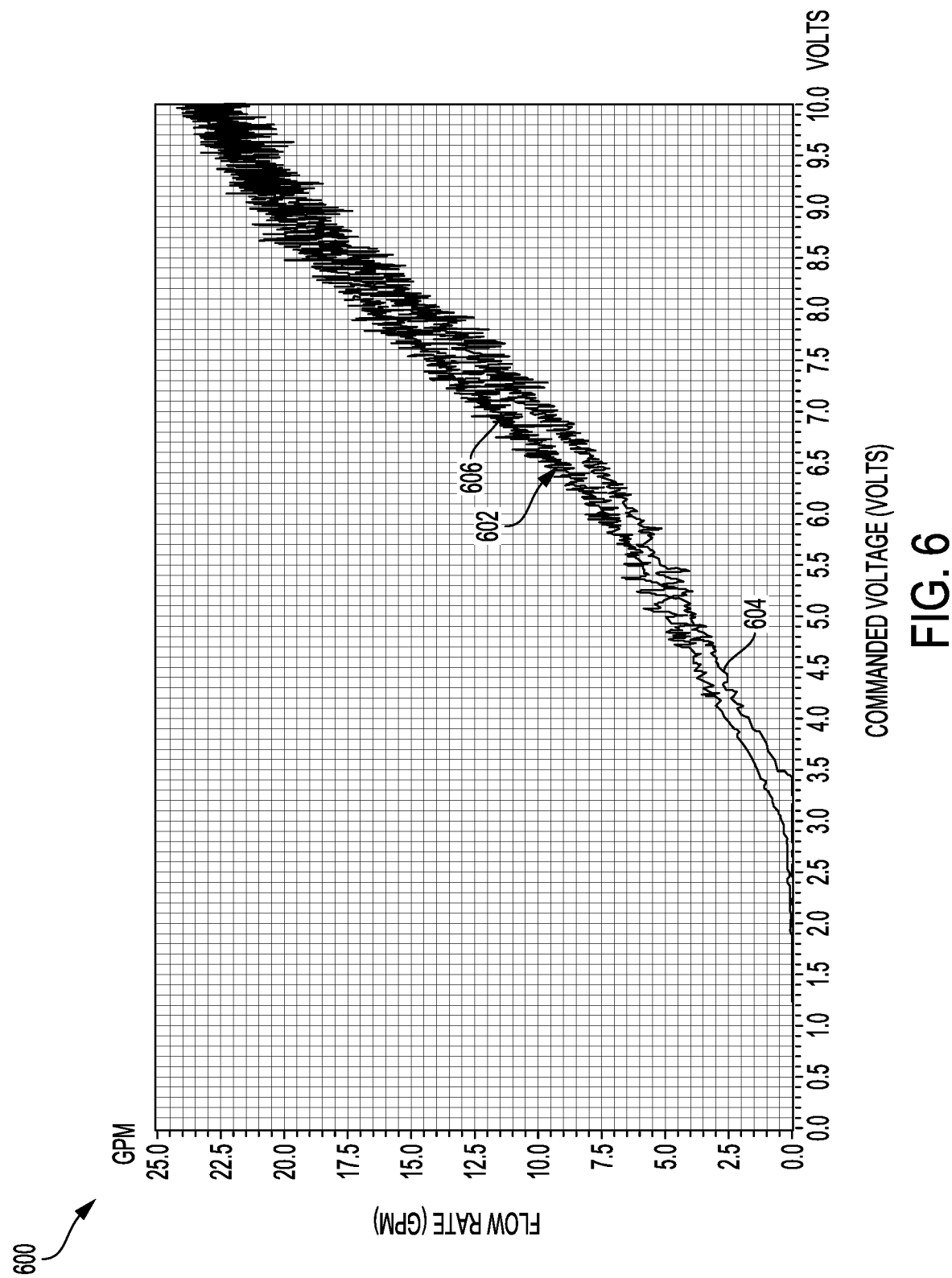
FIG. 6 illustrates a graph having a plot of variation of flow rate across the valve in FIG. 3 based on variation in commanded voltage to a solenoid coil, in accordance with an example implementation.

FIG. 6 illustrates a graph 600 having a plot 602 of variation of flow rate across the valve 300 based on variation in commanded voltage to the solenoid coil 137, in accordance with an example implementation. Commanded voltage is shown in Volts on the x-axis of the graph 600, and flow rate of fluid flow across the valve 300 is shown on the y-axis of the graph 600 in GPM.

As depicted in FIG. 6, commanded voltage is increased gradually, and the valve 300 does not open until the commanded voltage reaches about 3.4 volts. At that voltage, the solenoid force, aided by the force of the unseater spring 302, overcomes the combined forces of the spring 304 and the pressurized fluid in the chamber 131 acting on the second poppet 120. The second poppet 120 lifts off the second seat 122 and moves axially until the pressure $P_1$ becomes less than $$\frac{P_2 A_3}{(A_1 + A_2)},$$

and the first poppet 116 follows the second poppet 120, thereby causing the main flow from the second port 114 to the first port 112 to occur.

As mentioned above, the presence of the unseater spring 302 causes the solenoid force to oppose a more predictable force and smoother operation is achieved. Even though the main flow from the second port 114 to the first port 112 causes the pressure level at the second port 114 to collapse, the second poppet 120 and the first poppet 116 are not lunged or thrusted in the proximal direction, and the flow rate across the valve 300 is not increased abruptly. As depicted in FIG. 6, there is no abrupt change that corresponds to the portion 204 of FIG. 2. Rather, a portion 604 of the plot 602 indicates smooth (gradual) proportional increase in the flow rate as the commanded voltage is increased until a value of about 10 volts. The commanded voltage is then reduced gradually from the value of about 10 volts to zero volts, and the corresponding variation in flow rate is depicted by portion 606 of the plot 602.

As such, the presence of the unseater spring 302 substantially precludes abrupt changes in the flow rate as the first poppet 116 lifts off the first seat 118. As a result, an actuator or any other hydraulic component controlled by the valve 300 might not experience an abrupt increase in the flow rate of fluid provided thereto or received therefrom.

The configurations and components shown in FIGS. 1 and 3-5 are examples for illustration, and different configurations and components could be used. For example, different types of springs could be used. Further, rather than the solenoid actuator 104, a manual or other actuation mechanism could be used. As such, any type of actuator having a plunger can be used. The plunger operates similar to the armature 138 and can be coupled to the second poppet 120 to apply a force thereto. The plunger may be movable or actuatable manually via a lever or knob coupled thereto, or via a hydraulic or pneumatic pressure applied thereto.

In example implementations, several components may be integrated into a single component rather than having separate components. Further, although the valves 100 and 300 are shown as poppet valves, the configuration of the unseater spring 302 can also be implemented for other valve configurations involving a spool of a spool valve to preclude abrupt increase in flow rate across the spool.

As such, the description above with respect to operation of the valve 300 can be applied to any valve having: a sleeve (e.g., the sleeve 110); a first movable element (e.g., the first poppet 116) disposed in the sleeve, where the first movable element is configured to be seated on a first seat (e.g., the first seat 118) defined on an interior surface of the sleeve when the valve is in a closed state, and where the first movable element is configured to move axially within the sleeve; a second movable element (e.g., the second poppet 120) disposed, at least partially, in the first movable element, where the second movable element is configured to be seated on a second seat (e.g., the second seat 122) defined on an interior surface of the first movable element, and where the second movable element is configured to move axially within the first movable element; a first spring (e.g., the spring 304) that interfaces with the second movable element and applies a first force on the second movable element in a distal direction toward the second seat; a second spring (e.g., the unseater spring 302) that interfaces with the second movable element and applies a second force on the second movable element in a proximal direction opposite the distal direction; and an actuator comprising a plunger coupled to the second movable element, such that the plunger is configured to apply a third force on the second movable element in the proximal direction.

Figure 7:
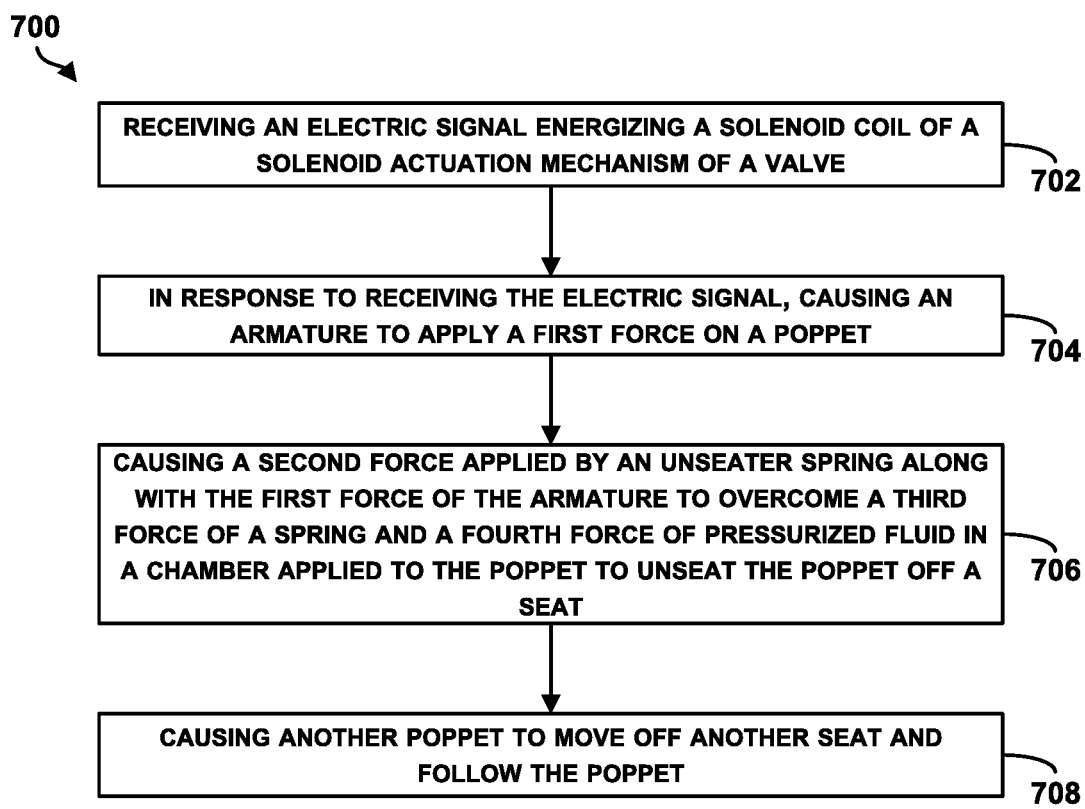
FIG. 7 illustrates a flowchart of a method of operating a valve, in accordance with an example implementation.

FIG. 7 illustrates a flowchart of a method 700 of operating a valve, in accordance with an example implementation. The method 700 shown in FIG. 7 presents an example of a method that could be used with the valve 300 described above and shown in FIGS. 3-5, for example. The method 700 may include one or more operations, functions, or actions as illustrated by one or more of blocks 702-708. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes receiving an electric signal energizing the solenoid coil 137 of the solenoid actuator 104 of the valve 300.

A controller of a hydraulic system or hydraulic circuit that includes the valve 300 may receive a request to actuate the valve 300. Accordingly, the controller may provide a command or electric signal to the solenoid coil 137 to open the valve 300.

At block 704, the method 700 includes, in response to receiving the electric signal, causing the armature 138 to apply a first force on the second poppet 120. As such, in response to energizing the solenoid coil 137, the armature 138 applies a force on the second poppet 120 in the proximal direction.

At block 706, the method 700 includes causing a second force applied by the unseater spring 302 along with the first force of the armature to overcome a third force of the spring 304 and a fourth force of the pressurized fluid in the chamber 131 applied to the second poppet 120 to unseat the second poppet 120 off the second seat 122. As a result, pilot flow is provided from the second port 114, through the chamber 128 and the flow area 400 to the first port 112.

At block 708, the method 700 includes causing the first poppet 116 to move off the first seat 118 and follow the second poppet 120. As a result, main flow is provided through the flow area 500 from the second port 114 to the first port 112.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations, friction between components, and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
   a sleeve;
   a first poppet disposed in the sleeve, wherein the first poppet is configured to be seated on a first seat defined on an interior surface of the sleeve when the valve is in a closed state, and wherein the first poppet is configured to move axially within the sleeve;
   a second poppet disposed, at least partially, in the first poppet, wherein the second poppet is configured to be seated on a second seat defined on an interior surface of the first poppet, and wherein the second poppet is configured to move axially within the first poppet, wherein the second poppet comprises a first cylindrical portion having a first diameter and a second cylindrical portion having a second diameter smaller than the first diameter such that the second poppet comprises a shoulder formed at a transition from the first diameter to the second diameter on an exterior surface of the second poppet;
   a first spring mounted about the exterior surface of the second poppet to the first cylindrical portion having the first diameter of the second poppet and applies a first force on the second poppet in a distal direction toward the second seat; and
   a second spring mounted to the second cylindrical portion of the second poppet, contacting the shoulder of the second poppet, and applies a second force on the second poppet in a proximal direction opposite the distal direction.

2. The valve of claim 1, wherein the second spring is disposed between the shoulder and an interior distal surface of the first poppet.

3. The valve of claim 1, further comprising:
   a housing, wherein the sleeve is disposed in the housing; and
   a spring support member fixedly disposed in the housing, wherein the second poppet comprises a flanged portion projecting from an exterior surface of the second poppet, and wherein the first spring is disposed between the spring support member and the flanged portion of the second poppet.

4. The valve of claim 3, wherein the second poppet comprises (i) a first cylindrical portion having a first diameter, and (ii) a second cylindrical portion having a second diameter different from the first diameter, wherein the first spring is disposed about a portion of the exterior surface of the second poppet having the first diameter, and wherein the second spring is disposed about the second cylindrical portion having the second diameter.

5. The valve of claim 1, further comprising:
   a housing, wherein the sleeve is disposed in the housing; and
   a solenoid actuator comprising:
      a solenoid tube disposed partially within the housing;
      a solenoid coil disposed about an exterior surface of the solenoid tube; and
      an armature disposed within the solenoid tube, wherein the armature is coupled to the second poppet, such that axial motion of the armature causes the second poppet to move axially off the second seat.

6. The valve of claim 5, wherein in response to energizing the solenoid coil, the armature applies a third force on the second poppet in the proximal direction along with the second spring.

7. The valve of claim 6, wherein the sleeve defines a first port and a second port, the valve further comprising:
   a chamber formed in the housing, wherein the first spring is disposed in the chamber, wherein when pressurized fluid is received at the second port, the pressurized fluid is communicated to the chamber, thereby applying a fourth force on the second poppet in the distal direction.

8. The valve of claim 7, wherein the chamber is a first chamber, wherein the first poppet includes a pilot feed orifice configured to fluidly couple the second port to a second chamber formed within the first poppet, wherein the pressurized fluid is communicated to the first chamber, in which the first spring is disposed, via: (i) unsealed space between an exterior surface of the first poppet and the interior surface of the sleeve, and (ii) through the pilot feed orifice, through the second chamber, and around an exterior surface of the second poppet.

9. The valve of claim 8, wherein the second poppet includes a longitudinal slot formed on the exterior surface of the second poppet and configured to fluidly couple the second chamber to the first chamber.

10. The valve of claim 8, wherein when the valve is in the closed state, the first poppet is configured to block fluid flow from the second port to the first port, wherein when the second force of the second spring and the third force of the armature acting on the second poppet in the proximal direction overcome the first force of the first spring and the fourth force of the pressurized fluid in the first chamber acting on the second poppet in the distal direction, the second poppet moves axially in the proximal direction off the second seat, thereby causing: (i) fluid in the second chamber to flow through a longitudinal channel formed in a distal end portion of the first poppet to the first port, and (ii) the first poppet to follow the second poppet and move axially off the first seat, thereby allowing fluid to flow from the second port to the first port.

11. The valve of claim 1, wherein the first spring has a first spring rate and the second spring has a second spring rate, wherein the second spring rate is smaller than the first spring rate.

12. A valve comprising:
   a sleeve defining a first longitudinal cylindrical cavity therein;
   a first movable element disposed in the first longitudinal cylindrical cavity of the sleeve, wherein the first movable element is configured to be seated on a first seat defined on an interior surface of the sleeve when the valve is in a closed state, wherein the first movable element is configured to move axially within the sleeve, and wherein the first movable element defines a second longitudinal cylindrical cavity therein;
   a second movable element disposed, at least partially, in the second longitudinal cylindrical cavity of the first movable element, wherein the second movable element is configured to be seated on a second seat defined on an interior surface of the first movable element, wherein the second movable element is configured to move axially within the first movable element, wherein the second movable element comprises a first cylindrical portion having a first diameter and a second cylindrical portion having a second diameter smaller than the first diameter such that the second movable element comprises a shoulder formed at a transition from the first diameter to the second diameter on an exterior surface of the second movable element;

a first spring mounted about the exterior surface of the second movable element to the first cylindrical portion having the first diameter of the second movable element and applies a first force on the second movable element in a distal direction toward the second seat;

a second spring mounted to the second cylindrical portion of the second movable element, contacting the shoulder of the second movable element, and applies a second force on the second movable element in a proximal direction opposite the distal direction; and an actuator comprising a plunger coupled to the second movable element, such that the plunger is configured to apply a third force on the second movable element in the proximal direction.

13. The valve of claim 12, wherein the second spring is disposed between the shoulder and an interior distal surface of the first movable element.

14. The valve of claim 13, further comprising:

a housing defining a third longitudinal cylindrical cavity therein, wherein the sleeve is disposed in the third longitudinal cylindrical cavity; and a spring support member fixedly disposed in the housing, wherein the second movable element comprises a flanged portion projecting from an exterior surface of the second movable element, wherein the first spring is disposed between the spring support member and the flanged portion of the second movable element, wherein the first spring is disposed about a portion of the exterior surface of the second movable element having the first diameter.

15. The valve of claim 12, wherein the first spring has a first spring rate and the second spring has a second spring rate, wherein the second spring rate is smaller than the first spring rate.

16. A hydraulic system comprising:
a source of pressurized fluid;
a reservoir; and
a valve comprising:

a sleeve defining a first port fluidly coupled to the reservoir and a second port coupled to the source of pressurized fluid;

a first poppet disposed in the sleeve, wherein the first poppet is configured to be seated on a first seat defined on an interior surface of the sleeve when the valve is in a closed state to block flow from the second port to the first port, and wherein the first poppet is configured to move axially within the sleeve;

a second poppet disposed, at least partially, within the first poppet, wherein the second poppet is configured to be seated on a second seat defined on an interior surface of the first poppet, and wherein the second poppet is configured to move axially within the first poppet, wherein the second poppet comprises a first cylindrical portion having a first diameter and a second cylindrical portion having a second diameter smaller than the first diameter such that the second poppet comprises a shoulder formed at a transition from the first diameter to the second diameter on an exterior surface of the second poppet;

a first spring mounted about the exterior surface of the second poppet to the first cylindrical portion having the first diameter of the second poppet and applies a first force on the second poppet in a distal direction toward the second seat; and a second spring mounted to the second cylindrical portion of the second poppet, contacting the shoulder of the second poppet, and applies a second force on the second poppet in a proximal direction opposite the distal direction.

17. The hydraulic system of claim 16, further comprising:
an actuator comprising a plunger coupled to the second poppet, such that the plunger is configured to apply a third force on the second poppet in the proximal direction.

18. The hydraulic system of claim 16, wherein the first spring has a first spring rate and the second spring has a second spring rate, wherein the second spring rate is smaller than the first spring rate.

* * * * *